(12) United States Patent
Samuni et al.

(10) Patent No.: US 9,690,645 B2
(45) Date of Patent: Jun. 27, 2017

(54) DETERMINING SUSPECTED ROOT CAUSES OF ANOMALOUS NETWORK BEHAVIOR

(71) Applicant: Hewlett-Packard Development Company, L.P., Houston, TX (US)

(72) Inventors: Eran Samuni, Yehud (IL); Ira Cohen, Yehud (IL); Ruth Bernstein, Yehud (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 50 days.

(21) Appl. No.: 14/649,183

(22) PCT Filed: Dec. 4, 2012

(86) PCT No.: PCT/US2012/067787
§ 371 (c)(1),
(2) Date: Jun. 2, 2015

(87) PCT Pub. No.: WO2014/088559
PCT Pub. Date: Jun. 12, 2014

(65) Prior Publication Data
US 2015/0347214 A1    Dec. 3, 2015

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0709* (2013.01); *G06F 11/0751* (2013.01); *G06F 11/30* (2013.01); *G06F 11/3452* (2013.01); *G06F 21/00* (2013.01); *G06F 21/552* (2013.01); *H04L 29/06* (2013.01); *H04L 41/064* (2013.01); *H04L 63/1425* (2013.01)

(58) Field of Classification Search
CPC ............... G06F 11/079; G06F 11/3452; G06F 11/3476; G06F 11/0793
See application file for complete search history.

(56) References Cited

U.S. PATENT DOCUMENTS 7,409,595 B2    8/2008    Nissan-Messing et al.
7,500,144 B2    3/2009    Chessell et al.
(Continued)

FOREIGN PATENT DOCUMENTS

JP    2007293392      11/2007
JP    2007293393 A    11/2007

OTHER PUBLICATIONS

Attariyan, M. et al., Automatic Root-cause Diagnosis of Performance Anomalies in Production Software, 12 pages, University of Michigan.
(Continued)

*Primary Examiner* — Charles Ehne

(57) ABSTRACT

Determining suspected root causes of anomalous network behavior includes identifying anomalous components in a network exhibiting anomalous behavior from a plurality of network components, assigning a likelihood score to network components based on a scoring policy that considers recent change events affecting the anomalous components, and identifying a subset of the network components that are suspected to be root causes based on the likelihood score.

20 Claims, 4 Drawing Sheets

(51) Int. Cl.
    *G06F 11/34* (2006.01)
    *G06F 11/30* (2006.01)
    *G06F 21/00* (2013.01)
    *G06F 21/55* (2013.01)
    *H04L 29/06* (2006.01)
    *H04L 12/24* (2006.01)

(56) References Cited

U.S. PATENT DOCUMENTS

| | | | |
|---|---|---|---|
| 7,877,803 | B2 | 1/2011 | Enstone et al. |
| 2005/0283656 | A1* | 12/2005 | Baumert ............. G06F 11/0742 714/6.13 |
| 2008/0195369 | A1 | 8/2008 | Duyanovich et al. |
| 2009/0013221 | A1* | 1/2009 | Yanagihara ............... G06F 1/24 714/55 |
| 2011/0078106 | A1 | 3/2011 | Luchi et al. |
| 2011/0087924 | A1* | 4/2011 | Kandula ............. G06F 11/0709 714/26 |
| 2011/0264424 | A1* | 10/2011 | Miwa ................. G05B 23/0278 703/2 |
| 2011/0320228 | A1 | 12/2011 | Kowalski |
| 2012/0030346 | A1 | 2/2012 | Fukuda et al. |
| 2012/0278663 | A1 | 11/2012 | Hasegawa |
| 2012/0284713 | A1 | 11/2012 | Ostermeyer et al. |
| 2014/0122691 | A1* | 5/2014 | Simhon ................. H04L 41/142 709/224 |

OTHER PUBLICATIONS

International Searching Authority, The International Search Report and the Written Opinion, Aug. 23, 2013, 11 pages.

Nadi, S. et al., DRACA: Decision Support for Root Cause Analysis and Change Impact Analysis for CMDBS, 2009, 11 pages, University of Waterloo, Canada.

\* cited by examiner

| 200 | Scoring Policy |
|---|---|
| 202 | Frequency Factor |
| 204 | Time Factor |
| 206 | Change Type Factor |
| 208 | Topology Factor |
| 210 | Other Factors |

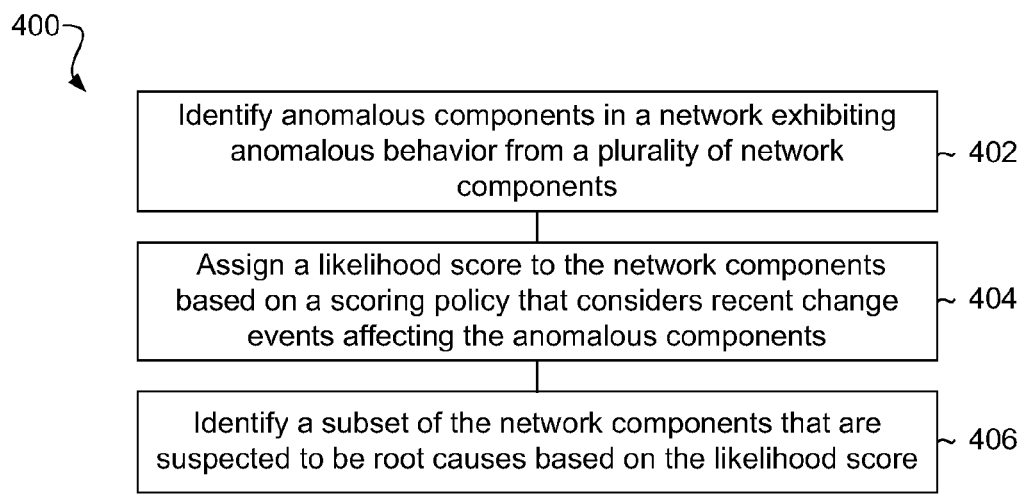

Fig. 3

| | | | |
|---|---|---|---|
| | Component | Score | Rank |
| 306 — | Server 1 | 8.3 | 1 |
| 304 — | Database | 7.6 | 2 |
| 308 — | Server 2 | 3.2 | 3 |

400 ⟶

| Identify anomalous components in a network exhibiting anomalous behavior from a plurality of network components | ~ 402 |
| Assign a likelihood score to the network components based on a scoring policy that considers recent change events affecting the anomalous components | ~ 404 |
| Identify a subset of the network components that are suspected to be root causes based on the likelihood score | ~ 406 |

Fig. 4

DETERMINING SUSPECTED ROOT CAUSES OF ANOMALOUS NETWORK BEHAVIOR

BACKGROUND

Information technology management systems help administrators detect and solve issues faced by various applications running in data centers and other types of networks. Such systems monitor various aspects of the information technology systems, such as application response time, resource utilization, and other parameters. The management systems collect the monitoring data and use it to detect the issues.

BRIEF DESCRIPTION OF THE DRAWINGS

The accompanying drawings illustrate various examples of the principles described herein and are a part of the specification. The illustrated examples are merely examples and do not limit the scope of the claims.

FIG. 3 is a diagram of an example of a ranking according to principles described herein.

FIG. 4 is a diagram of an example of a method for determining suspected root causes of anomalous network behavior according to principles described herein.

DETAILED DESCRIPTION

Often, when a network application has an issue, the symptoms of the issue are detected. However, the root cause of the issue is usually harder to identify. The root cause may be in any network component that is used to run the application, which could be one out of hundreds of network components. For example, an issue in a database may affect the response time of a business transaction that uses that database. A symptom of the issue is the transaction's increased response time, which is experienced by the application's users. But, the root cause, in this case, is the database. However, the application may use several databases and other virtual components. In virtualized environments, hundreds or thousands of change events occur on a daily basis. Thus, identifying the right network component that is the root cause is time consuming.

Often, the root cause results from a change event in the network, such as installing new code, updates, replacing hardware, shifting hosts for virtual components, adding hardware to a server, other changes, or combinations thereof. As a result, a user triaging the issue can reduce the time to the issue's resolution by understanding the network's recent changes events. The principles described herein include a method for determining suspected root causes of anomalous network behavior. Such a method includes identifying anomalous components in a network exhibiting anomalous behavior from a plurality of network components, assigning a likelihood score to each of the network components based on a scoring policy that considers recent change events affecting the anomalous components, and identifying a subset of the network components that are suspected to be root causes based on the likelihood score.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figures 1, 2:
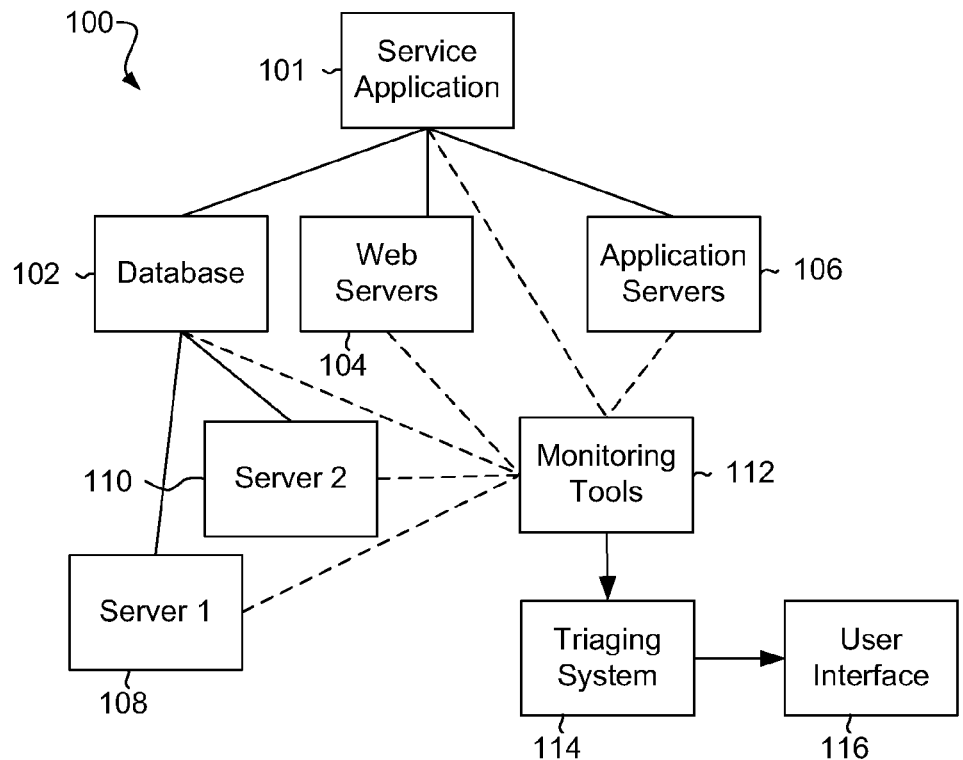
FIG. 1 is a diagram of an example of a network according to principles described herein.
FIG. 2 is a diagram of an example of scoring policy factors according to principles described herein.

FIG. 1 is a diagram of an example of a network (100) according to principles described herein. The network includes any physical or logical connections of any configuration items in an information technology environment. In this example, the network (100) includes an application service (101). The service is supported by and in communication with a database (102), web servers (104), and application servers (106). Further, the database (102) is further supported by and in communication with a first server (108) and a second server (110). While the example of FIG. 1 depicts the network with specific numbers and types of components, any number OF type of network component may be used in accordance with the principles described herein. In addition to physical components of the network, the network may include multiple virtual components that are hosted on one or multiple network physical components.

If an issue were to occur in either the first or the second servers (108, 110), then the database (102) will likely exhibit anomalous behavior. Likewise, if an issue arises in the database (102), the web servers (104), or the application servers (106), then the service will likely exhibit an anomalous behavior. Accordingly, if the first or the second servers (108, 110) have an issue that causes an anomalous behavior in the database (102), the service application (101) may also exhibit an anomalous behavior.

The network components are in communication with monitoring tools (112) that obtain information about the conditions of each network component. In some examples, the monitoring tools (112) include external sensors that request and receive information about each of the network components. In other examples, the monitoring tools (112) include installable program instructions to each of the network components. These program instructions monitor the conditions of the network components internally and send data to a common location for processing. The program instructions may send the data on a periodic basis, a demand basis, a requested basis, another basis, or combinations thereof.

The monitoring tools (112) send the data from the network components to a triaging system (114) that determines a baseline for the network components individually and collectively. The baseline is determined by reviewing the historical data obtained from the monitoring tools (112). The baseline determines the types of activity the network experiences on an hourly, daily, weekly, monthly, quarterly, or other basis. For example, the baseline network traffic on weekends may be different than the baseline traffic on week days. The baseline establishes the network's acceptable behavior and acceptable operating ranges based on that behavior. After the baseline is established, if the monitoring tools (112) determine that a network parameter is outside of the acceptable operating range, then that condition is considered to be anomalous behavior.

The triaging system (114) includes a monitoring engine to identify anomalous components in the network that exhibit anomalous behavior. A scoring engine in the triaging system (114) assigns a likelihood score to each of the network components based on a scoring policy that considers the change events occurring in the network. Further, a ranking engine in the triaging system (114) ranks a subset of the network components that are suspected to be root causes based on the likelihood score.

The monitoring tools (112) also track the change events that occur within the network. For example, the monitoring tools (112) record the time stamp, type of change event, the frequency of the change events, downstream affects of change events, other information, or combinations thereof. A change event may include installing program code to a network component, installing updates, adding or removing physical network components, creating a virtual network component, switching the host of a virtual network component, adding hardware to a server, other change events, or combinations.

The monitoring tools (112) also track the network's behavior to determine if a network component is exhibiting an anomalous behavior. Anomalous behaviors can be determined by comparing the current behavior of a network component to the baseline established with the triaging system (114). If a network component exhibits a behavior that is outside of an acceptable margin of error from the baseline, the triaging system (114) may be caused to identify the anomalous behavior indicating that an issue exists.

In response to identifying an issue or anomalous behavior, the triaging system (114) identifies the recent change events that occurred within the network. A change event is determined with a predetermined time threshold that includes the most likely change events that would be responsible for causing the network issue. The time threshold may be set by an administrator, a manufacturer, a learning mechanism, or combinations thereof.

Each of the network components that experienced recent change events is scored according to a scoring policy that scores how likely the identified component is the root cause of the anomalous behavior. Each of the network components is ranked according to its likelihood score, and the highest scoring components are classified as likely suspects. In some examples, all network components with a likelihood score over a predetermined threshold are classified as likely suspects. In other examples, a predetermined number of network components determines how many change events are classified as likely suspects. For example, a predetermined number may be ten. In such an example, the network components with the highest ten scores are the likely suspects. If the triaging system (114) determines that there are over a hundred recent network components with recent change events, then just the ten highest will be classified as likely suspects. On the other hand, if just nine network components with recent change events are identified, then all nine network components are classified as suspects. In some examples, a predetermined percentage of network components are classified as likely suspects based on their similarity score.

The triaging system (114) is caused to notify a user of the likely suspects. This may be accomplished through sending the user a message identifying the likely suspects. In other examples, the triaging system (114) makes the likely suspects available in a user interface (116).

The highest scored network component is classified as the prime suspect. The remaining likely suspects continue to hold their ranking after being sent to the user. Thus, the user has the option of determining the root cause of the issue with the prime suspect first. If the prime suspect is not the actual root cause, the user may proceed to trouble shoot the issue using the second highest scoring change event, and so forth. While the user is provided with the likely suspects, the user is not obligated to reference or use the likely suspects to triage the issue. While there is a substantial possibility that a change event is responsible for the network's anomalous behavior, in some examples, the issue is caused by something other than a change event. If none of the likely suspects prove to be the culprit for causing the network issue, the triaging system (114) may classify additional network components as likely suspects to be sent to the user or refer the user to information from a different program that evaluates non-change event as other possible suspects.

In some examples, the scoring policy is updated to reflect the most successful identifications of the root causes. Thus, the scoring policy may learn to be more accurate over time. In some examples, the triaging system (114) is caused to solicit feedback from the user about whether any of the likely suspects is the actual root cause. As the triaging system (114) obtains feedback, the scoring policy is updated.

FIG. 2 is a diagram of an example of scoring policy factors according to principles described herein. In this example, the scoring policy (200) includes a frequency factor (202), a time factor (204), a change type factor (206), a topology factor (208), and other factors (210).

The frequency factor (202) considers how often a particular type of change event occurs and how often a network issue results. For example, if switching a virtual component's host happens frequently within the network and rarely causes anomalous behavior, then a network component involved in switching hosts is less likely to receive a high likelihood score. On the other hand, if switching the hosts occurs rarely and has historically caused issues, then network components involved in switching the host are likely to receive a higher likelihood score.

The time factor considers (204) the time between the identification of the anomalous behavior and the time recorded on the time stamp of the change event. For example, if a change event occurred immediately before the anomalous behavior manifests itself, the network component involved with the change event will receive a higher likelihood score. On the other hand, if a couple of minutes have passed between the occurrence of the change event and the occurrence of the anomalous behavior, the network component involved with the change event will receive a lower likelihood score.

The change type factor (206) considers the type of change to the network. If the change event involves a change event type that is likely to cause a network issue, then its associated network component will likely have a higher likelihood score.

The topology factor (208) considers the proximity of the network component that experiences the change event and the location where the anomalous behavior is manifested. The proximity refers to the logical and/or physical network connections between network components. For example, if the anomalous behavior is exhibited in a network component that recently experienced a change event, then that network component's likelihood score will be high. Similarly, the likelihood score would also be high if the change event occurred in another network device that was connected to the network device that experienced the change event. However, the network components that are not logically or physically connected to a network component that experiences a recent change event will likely receive lower likelihood scores.

The scoring policy (200) may use other factors to generate the likelihood scores. In some examples, each of the factors is given equal weight. In other examples, the factors are weighted. However, the system may include a learning mechanism that allows the scoring policy to be changed over time to become more accurate as the system gains experience identifying the change events responsible for creating network issues.

The scoring policy may use a predictability model, another mechanism to calculate a score, or combinations thereof to determine the score. In a predictability model (PPM), let $C_p$, represent a set of anomalous behaving network components and let S represent a set of network components that are likely suspects. S may be equal to or included in $C_p$. Let CH presents a set of change events. Each change event in CH includes at least one attribute, such as a change type, an identification of the network component, a time stamp, a network connection, another attribute, or combinations thereof. Each of the change event inputs is described as CH={$Ch_j$} and each $Ch_j$ has a change type represented as $T_i$=Type($Ch_j$). Calculations in the PPM for a $Ch_j$ is dependent on the $T_i$ such that PPM($Ch_i$)=PPM($T_i$).

In calculating the PPM $_t$ using a temporal date, the variable F, is defined as: if $F_i$=1, then a change event has occurred, if $F_i$=0, then no change event has occurred. The scoring policy may follow the following function:

PPM($T_i$)=P(Problem=true|$F_i$)=(Count(Problem=true ∩$F_i$))/(Count($F_i$)), where Count(Problem=true∩$F_i$) is a count of all the occasions in which a change of type $T_i$ occurred within a recent time period after the anomalous behavior began, and where Count($F_i$) represents a count of all occurrences of the changes of type $T_i$. The recent time period's duration may be predetermined by a user, a learning mechanism, a manufacture, another source, or combinations thereof. These counters may be calculated over time through a learning mechanism where older, less relevant data is not used in the calculation. Multiple calculation functions may exists depending on the variations in the baseline. For example, if the observed baseline includes consistent differences in the network's behavior during different time periods, like day and night, there may be a separate function for those different time periods.

To calculate PPM$_c$ using cross-component data, let TotalC$_i$ be the set of components which had a change from type $T_i$ performed on them just before the current anomalous behavior's start time. TotalC$_i$ includes components from the entire network, not just a portion of the network that contains the anomalous behaving components. Thus, the intersection of TotalC$_i$ with the anomalous components (TotalC$_i$∩C$_p$) is a set of components which had a change of type $T_i$ performed on them and are now anomalous. PPM$_c$ calculates the likelihood of a change of type $T_i$ which happened recently to predict the current anomalous behavior. This may be represented as PPM$_c$($T_i$)=(Count(TotalC$_i$∩Cp)/(Count(TotalC$_i$)).

The predictability models are combined into a signal score function. For each change $Ch_j$, the PPM is calculated by averaging the two models described above as:

PPM$_c$($T_i$)=(PPM$_t$($T_i$)+PPM$_c$($T_i$))/(2).

For each suspect $S_k$ ∈ S, the score is calculated according to the change related to $S_k$ with the highest PPM value, which is represented as:

Score($S_k$)=MAX$_{\{Ch_j \in Sk\}}$PPM(Type($Ch_j$))

The suspects are ordered by their score, and the top suspects are reported to the user along with the change that had the maximum PPM score tagged as the most relevant change.

FIG. 3 is a diagram of an example of a ranking (300) according to principles described herein. In this example, network components of the network (100, FIG. 1) have been identified as having experienced recent change events when an anomalous behavior occurred in the network. Each of the network components with recent change events is listed in a table (302). The web servers (104, FIG. 1) and the application servers (106, FIG. 1) are not listed because, in this example, they were not involved in a recent change event. However, in this example, the database (304), the first server (306), and the second server (308) were recently involved with a change event, and are thus listed in the table (302).

Each of the listed components is listed in the first column (310) of the table (302). Each network component has a likelihood score in the second column (312) and a rank number in the third column (314). In the example of FIG. 3, a predetermined suspect number threshold is symbolized with dashed line (316). In this example, to become a likely suspect, the network component needs at least a score of five out of ten. Thus, the first server (306) and the database (304) are the likely suspects, with the first server (306) being the prime suspect. The second server (308) has a score that falls below the threshold, and thus, is not classified as a likely suspect. While this example describes a specific likely suspect determination policy, any appropriate mechanism may be used to determine which of the top scoring network components are to be classified as likely suspects in accordance with the principles described herein.

FIG. 4 is a diagram of an example of a method (400) for determining suspected root causes of anomalous network behavior according to principles described herein. In this example, the method (400) includes identifying (402) anomalous components in a network exhibiting anomalous behavior from a plurality of network components, assigning (404) a likelihood score to each of the network components based on a scoring policy that considers recent change events affecting the anomalous components, and identifying (406) a subset of the network components that are suspected to be root causes based on a likelihood score.

The method may also include determining a baseline behavior based on the collected data about the network components and collecting data about the recent change events in the network over time. The network components within the subset are ranked such that the network components with the higher likelihood scores are ranked higher. A notification is also sent to a user identifying the subset.

The scoring policy may be based on multiple factors. A non-exhaustive list of factors includes frequency factors, duration factors, change type factors, topology factors, other factors, and combinations thereof.

Figure 5:
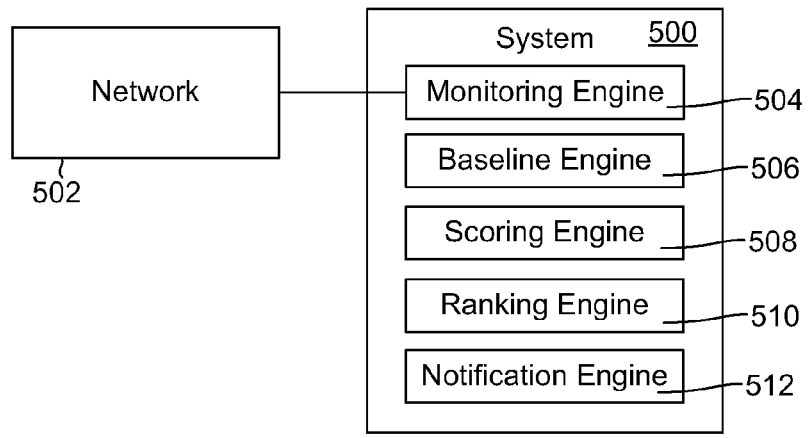
FIG. 5 is a diagram of an example of a triaging system according to principles described herein.

FIG. 5 is a diagram of an example of a triaging system (500) according to principles described herein. In this example, the triaging system (500) is in communication with the network (502) through the monitoring engine (504). The triaging system (500) also includes a baseline engine (506), a scoring engine (508), a ranking engine (510), and a notification engine (512). The engines (504, 506, 508, 510, 512) refer to a combination of hardware and program instructions to perform a designated function. Each of the engines (504, 506, 508, 510, 512) may include a processor and memory. The program instructions are stored in the memory and cause the processor to execute the designated function of the engine.

The monitoring engine (504) obtains data from the network about the network's conditions and about change events. The baseline engine (506) uses the input collected by the monitoring engine (504) to determine a baseline for how the network components operate. If the monitoring engine (504) determines that a network component is operating outside of an acceptable range from the baseline, then the scoring engine (508) scores each of the network components that was recently involved with a change event.

A ranking engine (510) ranks the network components according to their scores. The network components with the highest scores are classified as likely suspects, and the notification engine (512) sends information identifying the likely suspects to a location where a user can access the information.

Figure 6:
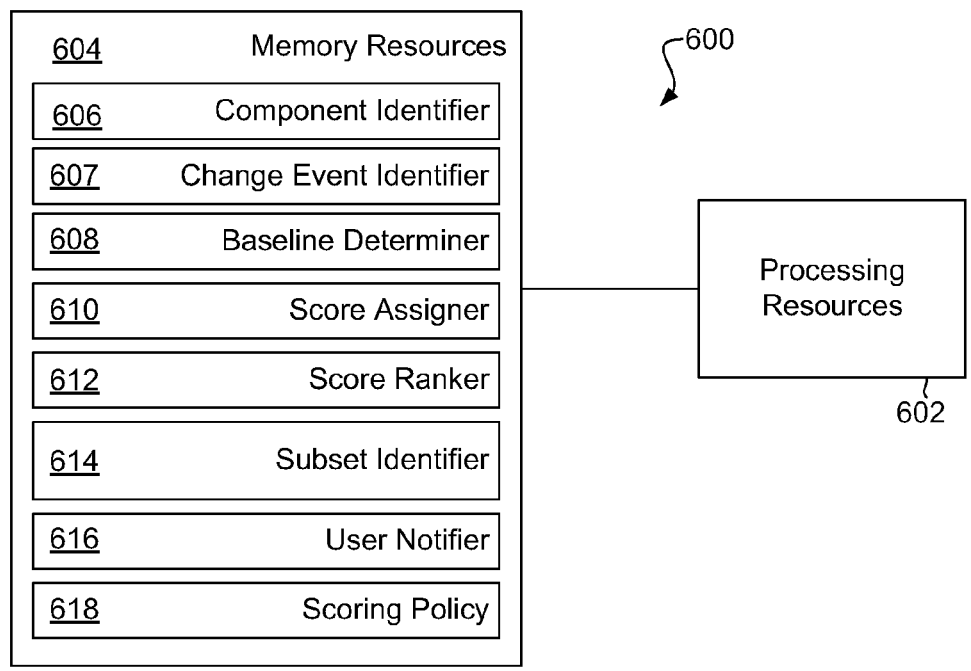
FIG. 6 is a diagram of an example of a triaging system according to principles described herein.

FIG. 6 is a diagram of an example of a triaging system (600) according to principles described herein. In this example, the triaging system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the triaging system (600). The programmed instructions shown stored in the memory resources (604) includes a component identifier (606), a change event identifier (607), a baseline determiner (608), a score assigner (610), a score ranker (612), a subset identifier (614), and a user notifier (616). The data structures shown stored in the memory resources (604) include a scoring policy (618).

The memory resources (604) include a computer readable storage medium that contains computer readable program code to cause tasks to be executed by the processing resources (602). The computer readable storage medium may be tangible and/or non-transitory storage medium. A non-exhaustive list of computer readable storage medium types includes non-volatile memory, volatile memory, random access memory, mernristor based memory, write only memory, flash memory, electrically erasable program read only memory, or types of memory, or combinations thereof.

The component identifier (606) represents programmed instructions that, when executed, cause the processing resources (602) to identify the component of the network. A baseline determiner (608) represents programmed instructions that, when executed, cause the processing resources (602) to determine the baseline operating conditions of the network components. The baseline may include baseline measurement under acceptable operating conditions as well as baseline behaviors in response to acceptable change events.

The change event identifier (607) represents programmed instructions that, when executed, cause the processing resources (602) to identify recent change events in the network in response to a detection of an anomalous behavior in the network. The anomalous behavior is identified when a network component operates outside of an acceptable operating parameter measured from the baseline.

The score assigner (610) represents programmed instructions that, when executed, cause the processing resources (602) to assign a score to each network component identified as having recently been involved with a change event. The score assigner calculates the score based on the scoring policy (618), which is a data structure of scoring rules stored in the memory resources. A score ranker (612) represents programmed instructions that, when executed, cause the processing resources (602) to rank the network components according to their scores.

A subset identifier (614) represents programmed instructions that, when executed, cause the processing resources (602) to identify a subset of the ranked network components with the highest ranking. The network components included within the subset are classified as likely suspects. The user notifier (616) represents programmed instructions that, when executed, cause the processing resources (602) to notify a user about the likely suspects.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (604) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries and may be accessed from a remote location over a network connection while the programmed instructions are located locally. Thus, the triaging system (600) may be implemented on a user device, on a server, on a collection of servers, or combinations thereof.

The triaging system (600) of FIG. 6 may be part of a general purpose computer. However, in alternative examples, the triaging system (600) is part of an application specific integrated circuit.

Figure 7:
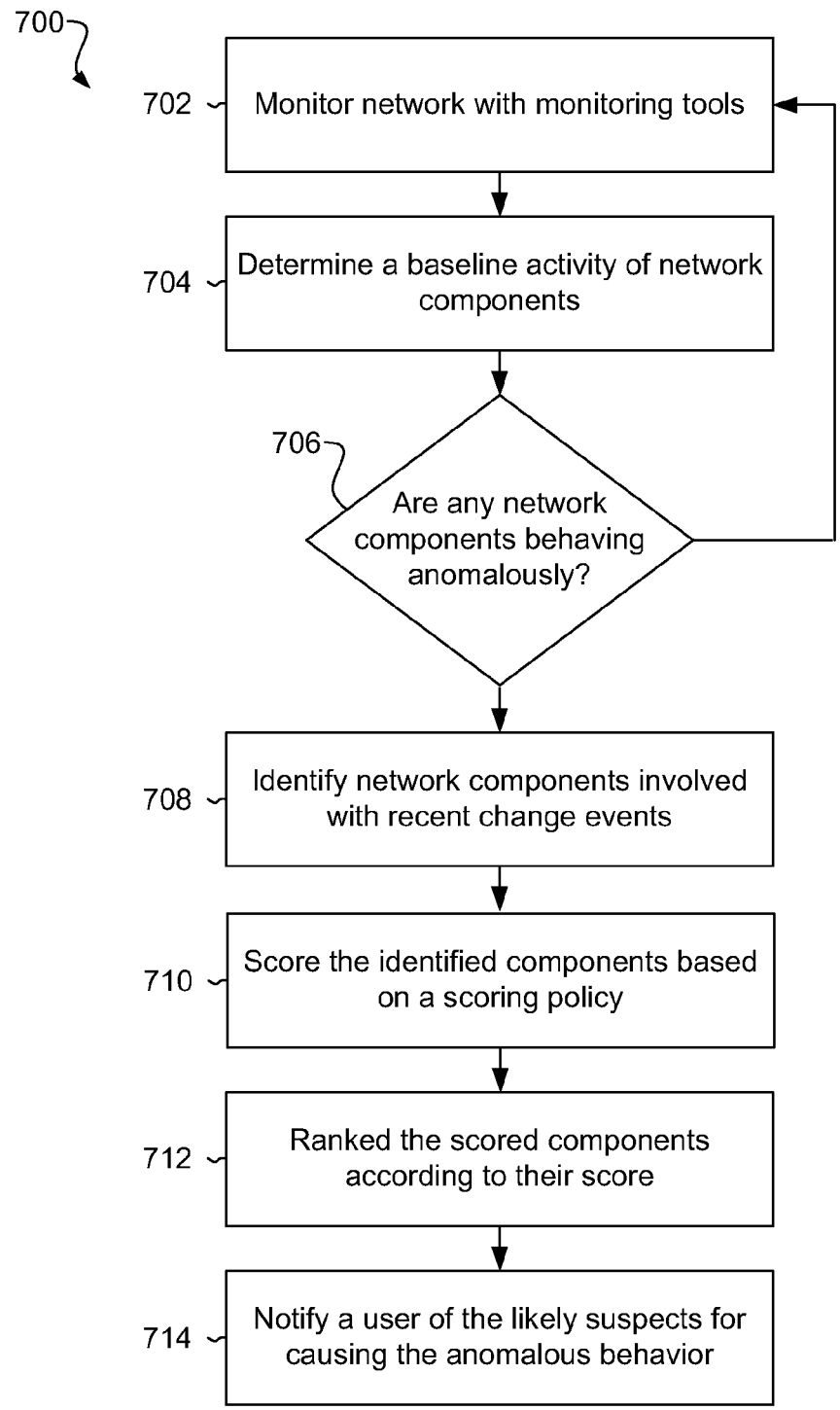
FIG. 7 is a diagram of an example of a flowchart of a process for determining suspected root causes of anomalous network behavior according to principles described herein.

FIG. 7 is a diagram of an example of a flowchart (700) of a process for determining suspected root causes of anomalous network behavior according to principles described herein. In this example, the process includes monitoring (702) the network with monitoring tools and determining (704) a baseline activity of the network components.

The process also includes determining (706) if any of the network components are behaving anomalously. If no network components are behaving anomalously, then the process includes continuing to monitor (702) the network. However, if a network component is behaving anomalously, then the process includes identifying (708) network components involved with recent change events.

The identified network components are scored (710) based on a scoring policy that is based on multiple factors that relate to how likely the network components are to being the root cause of the anomalous behavior. Next, the scored network components are ranked (712) according to their score. The higher the likelihood score, the higher the ranking. The network components with the highest ranking are classified as likely suspects. The user is notified (714) of the likely suspects for causing the anomalous behavior.

While the examples above have been described with reference to specific network components, network topologies, and numbers of network components, any appropriate type of network component, topology, or number of network components may be used in accordance with the principles described herein. Further, while the examples above have been described with reference to specific types of monitoring tools, any appropriate mechanism for monitoring the network may be used in accordance with the principles described herein.

Also, while the examples above have been described with reference to specific scoring factors, any appropriate factor relevant to determining whether a network component is likely a root cause may be used in accordance with the principles described herein. Additionally, while the examples above have been described with reference to specific mechanisms for determining a subset of likely suspects from the scored networked components, any appropriate mechanism for determining which of the highest scored network components should be classified as likely suspects may be used. Also, any appropriate mechanism for notifying the user of the likely suspects may be used in accordance with the principles described herein.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A computer program product for determining suspected root causes of anomalous network behavior, comprising:
a non-transitory computer readable storage medium, said non-transitory computer readable storage medium comprising computer readable program code embodied therewith, said computer readable program code comprising program instructions that, when executed, causes a processor to:
identify anomalous components in a network exhibiting anomalous behavior from a plurality of network components;
assign a likelihood score to said network components based on a scoring policy that considers recent change events affecting said anomalous components, wherein said scoring policy includes at least one of a frequency factor that considers how often a selected change event occurs within said network, a duration factor that considers a time duration between an occurrence of a selected change event and a beginning of said anomalous behavior, or a change type factor that considers a type of change event; and
identify a subset of said network components that are suspected to be root causes based on said likelihood score.

2. The computer program product of claim 1, further comprising computer readable program code to, when executed, cause said processor to rank said network components within said subset such that said network components with higher likelihood scores are ranked higher.

3. The computer program product of claim 1, further comprising computer readable program code to, when executed, cause said processor to send a notification identifying said subset.

4. The computer program product of claim 1, further comprising computer readable program code to, when executed, cause said processor to collect data about said recent change events in said network over time.

5. The computer program product of claim 4, further comprising computer readable program code to, when executed, cause said processor to determine a baseline behavior based on said collected data about said network components.

6. The computer program product of claim 1, wherein said scoring policy includes the frequency factor that considers how often the selected change event occurs within said network.

7. The computer program product of claim 1, wherein said scoring policy includes the duration factor that considers the time duration between the occurrence of the selected change event and the beginning of said anomalous behavior.

8. The computer program product of claim 1, wherein said scoring policy includes the change type factor that considers the type of change event.

9. The computer program product of claim 1, wherein said scoring policy includes a topology factor that considers which of said network components are logically connected to said anomalous components.

10. The system of claim 1, wherein said scoring policy includes the change type factor that considers the type of change event.

11. A system for determining suspected root causes of anomalous network behavior, comprising:
a monitoring engine to identify anomalous components in a network exhibiting anomalous behavior from a plurality of network components;
a scoring engine to assign a likelihood score to each of said network components based on a scoring policy that considers network change events, wherein said scoring policy includes at least one of a frequency factor that considers how often a selected change event occurs within said network, a duration factor that considers a time duration between an occurrence of a selected change event and a beginning of said anomalous behavior, or a change type factor that considers a type of change event; and
a ranking engine to rank a subset of said network components that are suspected to be root causes based on said likelihood score such that said network components with higher likelihood scores are ranked higher.

12. The system of claim 11, further comprising a notification engine to send a notification identifying said subset.

13. The system of claim 11, wherein said monitoring engine collects data about said recent change events in said network over time.

14. The system of claim 13, further comprising a baseline engine to determine a baseline behavior based on said collected data about said network components.

15. The system of claim 11, wherein said scoring policy includes the frequency factor that considers how often the selected change event occurs within said network.

16. A method for determining suspected root causes of anomalous network behavior, comprising:
identifying anomalous components in a network exhibiting anomalous behavior from a plurality of network components;
assigning a likelihood score to said network components based on a scoring policy that considers network change events, wherein said scoring policy includes at least one of a frequency factor that considers how often a selected change event occurs within said network, a duration factor that considers a time duration between an occurrence of a selected change event and a beginning of said anomalous behavior, or a change type factor that considers a type of change event;

identifying a subset of said network components that are suspected to be root causes based on said likelihood score; and ranking said network components in said subset based on said likelihood score.

17. The method of claim 16, wherein identifying anomalous components in said network exhibiting anomalous behavior from said plurality of network components includes collecting data about said recent change events in said network over time and determining a baseline behavior based on said collected data about said network components.

18. The method of claim 16, wherein said scoring policy includes the frequency factor that considers how often the selected change event occurs within said network.

19. The method of claim 16, wherein said scoring policy includes the duration factor that considers the time duration between the occurrence of the selected change event and the beginning of said anomalous behavior.

20. The method of claim 16, wherein said scoring policy includes the change type factor that considers the type of change event.

* * * * *